United States Patent Office 3,637,852
Patented Jan. 25, 1972

3,637,852
1-PHENOXY-2-HYDROXY-3-ISOPROPYLAMINO-
PROPANES AND SALTS THEREOF
Herbert Köppe, Ingelheim, Albrecht Engelhardt, Mainz, Gerhard Ludwig, Wedel, and Karl Zeile, Ingelheim, Germany, assignors to Boehringer Ingelheim G.m.b.H., Ingelheim am Rhine, Germany
No Drawing. Continuation-in-part of application Ser. No. 391,012, Aug. 20, 1964. This application Feb. 28, 1967, Ser. No. 619,191
Claims priority, application Germany, Aug. 26, 1963, B 73,262; Feb. 6, 1967, B 91,070
Int. Cl. C07c 93/00, 93/02
U.S. Cl. 260—570.7
3 Claims

ABSTRACT OF THE DISCLOSURE 1-substituted phenoxy-2-hydroxy-3-N-isopropyl-amino-propanes and acid addition salts thereof, possessing bradycardia activity and N-isopropyl-nor-adrenaline antagonistic activity.

The present application is a continuation-in-part application of copending, commonly assigned, application Ser. No. 391,012, filed Aug. 20, 1964, now abandoned.

This invention relates to novel 1-aryloxy-2-hydroxy-3-isopropylamino-propanes and acid addition salts thereof, as well as to various methods of preparing these compounds.

More particularly, the present invention relates to 1-substituted phenoxy-2-hydroxy-3-isopropylamino-propanes of the formula

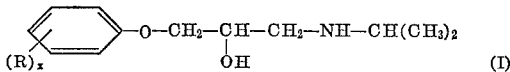

wherein R is selected from the group consisting of chlorine, straight or branched alkyl of 1 to 4 carbon atoms, straight or branched alkoxy of 1 to 4 carbon atoms, hydroxy, hydroxyalkyl of 1 to 4 carbon atoms, hydroxycarbonyl, alkoxycarbonyl of 1 to 4 carbon atoms, alkanoyl of 2 to 4 carbon atoms and aralkoxy, and $x$ is a whole number from 1 to 3, inclusive, provided, however, that R is other than o-chloro, o-methyl and o-methoxy when $x$ is 1 and other than 2,6-dimethyl and 2,4-dimethyl when $x$ is 2, and their non-toxic, pharmacologically acceptable acid addition salts.

The compounds according to the present invention may be prepared by a number of different methods involving known chemical reaction principles; however, among these, the following methods have been found to be most convenient and efficient:

METHOD A

By reacting an epoxide of the formula

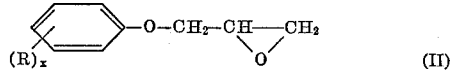

where R and $x$ have the same meanings as in Formula I, with isopropylamine in the presence of an inert solvent, such as ethanol.

METHOD B

By reacting a 1-substituted phenoxy-2-hydroxy-3-halo propane of the formula

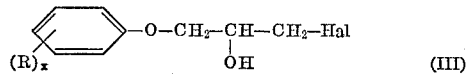

wherein R and $x$ have the same meanings as in Formula I and Hal is halogen, with isopropylamine in the presence of an inert solvent, such as ethanol.

METHOD C

By reacting a 1-substituted phenoxy-2-hydroxy-3-amino-propane of the formula

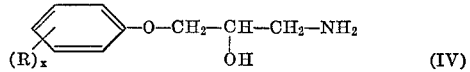

wherein R and $x$ have the same meanings as in Formula I, with an isopropyl halide.

METHOD D

By hydrolizing and oxazolidone of the formula

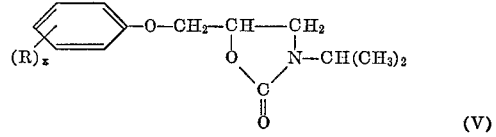

wherein R and $x$ have the same meanings as in Formula I.

METHOD E

By reacting a substituted phenolate of the formula

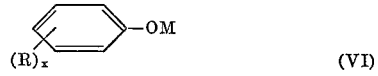

wherein R and $x$ have the same meanings as in Formula I and M is a monovalent cation, preferably an alkali metal, with a 1 - halo - 2 - hydroxy - 3 - isopropylamino-propane.

METHOD F

By hydrogenating a 1-substituted phenoxy-2-hydroxy-3-benzylisopropylamino-propane of the formula

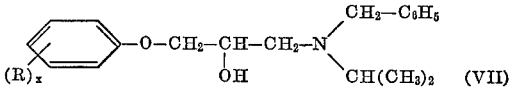

wherein R and $x$ have the same meanings as in Formula I.

METHOD G

By reducing a ketone of the formula

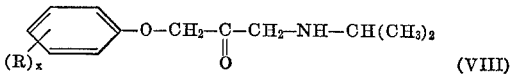

wherein R and $x$ have the same meanings as in Formula I, with catalytically activated hydrogen or a boranate, such as aluminum boranate.

The starting compounds of the Formulas II to VIII for the above methods are known compounds or may readily be prepared by known methods.

The free bases of the Formula I obtained by any of the above methods, A through G, may subsequently be transformed into non-toxic, pharmacologically acceptable acid addition salts by conventional methods, that is, by acidifying a solution of the free base with the desired acid and recovering the acid addition salt by evaporation of the solvent or by precipitation, for instance.

Examples of non-toxic, pharmacologically acceptable acid addition salts of the bases are those formed with hydrochloric acid, hydrobromic acid, sulfuric acid, phosphoric acid, methane sulfonic acid, acetic acid, lactic acid, tartaric acid, ascorbic acid, 8-chlorotheophylline and the like.

The following examples further illustrate the present invention and will enable others skilled in the art to understand it more completely. It should be understood, however, that our invention is not limited to the specific examples given below.

EXAMPLE 1

Preparation of 1-(2',4'-dichlorophenoxy)-2-hydroxy-3-isopropylamino-propane and its hydrochloride by Method A A solution of 100 gm. (1.7 mols) of isopropylamine in 60 cc. of water was stirred into a solution of 94.5 gm. (0.405 mol) of 1-(2',4'-dichlorophenoxy)-propyleneoxide. After the exothermic reaction had subsided, the reaction mixture was heated for two hours at 60° C. Thereafter, the aqueous ethanol was distilled off, and the solid residue was dissolved in aqueous hydrochloric acid comprising more than the theoretical stoichiometric molar equivalent of hydrochloric acid. The aqueous acid solution was extracted with ether and was then made alkaline with sodium hydroxide, whereby a solid crystalline precipitate was formed which was filtered off and dried over phosphorus pentoxide. 112.5 gm. (93.7% of theory) of 1-(2',4'-dichlorophenoxy)-2-hydroxy-3-isopropylamino-propane of the formula

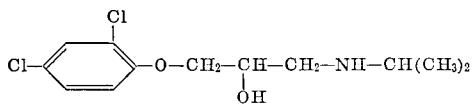

were obtained. The product was dissolved in ethanol, the resulting solution was acidified with ethereal hydrochloric acid, and the precipitate formed thereby was recrystallized from a mixture of ethanol and ether. The hydrochloride of the base thus obtained had a melting point of 150.5–152° C.

EXAMPLE 2

Preparation of 1-(3'-methyl-phenoxy)-2-hydroxy-3-isopropylamino-propane and its hydrochloride by Method A A solution of 59 gm. (1 mol) of isopropylamine in 60 cc. of water was added to a solution of 82 gm. (0.5 mol) of 1-(3'-methyl-phenoxy)-propyleneoxide in 400 cc. of ethanol. After the exothermic reaction had subsided, the reaction mixture was stirred for two hours at 60° C. Thereafter, the volatile components of the reaction mixture were distilled off and the solid residue was dissolved in aqueous hydrochloric acid. The acid solution was extracted with ether and was then made alkaline with sodium hydroxide. The precipitate formed thereby was separated and dried over phosphorus pentoxide, yielding 101.9 gm. (91.3% of theory) of raw 1-(3'-methyl-phenoxy)-2-hydroxy-3-isopropylamino-propane of the formula

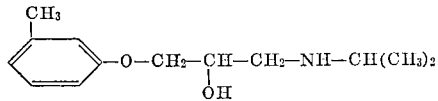

After recrystallization from a mixture of ethyl acetate and petroleum ether the base had a melting point of 75–76° C.

The base was dissolved in ethanol, the resulting solution was acidified with ethereal hydrochloric acid, and the precipitate was recrystallized from a mixture of ethanol and ether. The hydrochloride of the base thus obtained had a melting point of 120–121° C.

EXAMPLE 3

Preparation of 1-(2',3'-dimethyl-phenoxy)-2-hydroxy-3-isopropylamino-propane and its hydrochloride by Method A 17.8 gm. (0.1 mol) of 1-(2',3'-dimethyl-phenoxy)-propyleneoxide were dissolved in 100 cc. of ethanol, the resulting solution was admixed with a solution of 17.7 gm. (0.3 mol) of isopropylamine in 15 cc. of water, and the mixture was first allowed to stand at room temperature for two hours and was then heated for three hours at 50–50° C. Thereafter, the aqueous ethanol was distilled off, the residue was dissolved in hydrochloric acid, and the solution was extracted with ether. The aqueous phase was made alkaline with aqueous 20% sodium hydroxide, whereby a crystalline precipitate was formed which was separated and dried. 21.5 gm. (90.7% of theory) of 1-(2',3'-dimethyl-phenoxy)-2-hydroxy - 3 - isopropylamino-propane of the formula

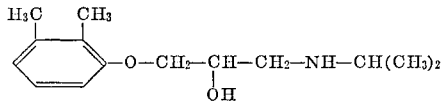

were obtained.

The base was dissolved in ethanol, the solution was acidified with ethereal hydrochloric acid, and the precipitate formed thereby was recrystallized from a mixture of ethanol and ether. The hydrochloride of the base thus obtained had a melting point of 150–151° C.

EXAMPLE 4

Preparation of 1-(3'-chloro-phenoxy)-2-hydroxy-3-isopropylamino-propane and its hydrochloride by Method A 14.8 gm. (0.08 mol) of 1-(3'-chloro-phenoxy)-propyleneoxide in ethanolic solution were reacted with isopropylamine as described in the preceding examples. After evaporating the ethanol, the precipitate, 1-(3'-chloro-phenoxy)-2-hydroxy-3-isopropylamino-propane, was separated by vacuum filtration, dried and dissolved in a small amount of ethanol and the resulting solution was acidified with ethereal hydrochloric acid. The crystalline precipitate formed thereby was separated and recrystallized from a mixture of ethanol and ether. 12.6 gm. (56% of theory) of the hydrochloride of the formula

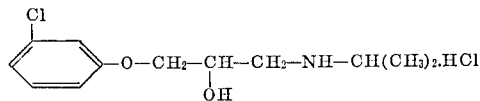

were obtained. The product had a melting point of 86–88° C.

EXAMPLE 5

Preparation of 1-(2',4',5'-trichloro-phenoxy)-2-hydroxy-3-isopropylamino-propane and its hydrochloride by Method B 0.1 mole of 1-(2',4',5'-trichlorophenoxy)-3-bromopropanol-2 was dissolved in 75 cc. of ethanol and 0.3 mole of isopropylamine were added to the solution. After the exothermic reaction had subsided, the reaction mixture was allowed to stand overnight at room temperature after which it was heated to 60° C. for three hours. The ethanol was distilled off in vacuo and the residue was worked up as described in Example I to obtain the free base, 1 - (2',4',5' - trichloro - phenoxy) - 2 - hydroxy-3-isopropylamino-propane. The free base then converted into its hydrochloride which had a melting point of 156–158° C. after recrystallization from a mixture of ethanol and ether.

EXAMPLE 6

Preparation of 1-(3'-hydroxy-phenoxy)-2-hydroxy-3-isopropylamino-propane and its hydrochloride 11.2 gm. (0.05 mol) of 1-(3'-amino-phenoxy)-2-hydroxy-3-isopropylamino-propane were dissolved in a cold mixture of 50 cc. of water and 10 cc. of concentrated sulfuric acid. To the resulting solution, 6.9 gm. (0.1 mol) of $NaNO_2$ in 30 cc. of water were added dropwise, and the solution was allowed to stand at room temperature for 12 hours. Thereafter the solution was made alkaline with ammonia and was then extracted with ether. The ether layer was dried over $MgSO_4$ and the ether distilled off, and the solid residue was crystallized from ethyl acetate. The base thus obtained was dissolved in acetonitrile, the resulting solution was acidified with ethereal hydrochloric acid, and the precipitate formed thereby was recrystallized from a mixture of ethanol and ether. The 1 - (3' - hydroxy - phenoxy)-2-hydroxy-3-isopropylamino-propane hydrochloride thus obtained had a melting point of 125–127° C.

EXAMPLE 7

Using a procedure analogous to that described in Example 1, 1 - (4' - methoxy - phenoxy)-2-hydroxy-3-isopropylamino-propane was prepared from 4-methoxyphenoxy-propyleneoxide and isopropylamine. Its hydrochloride had a melting point of 141–142° C.

EXAMPLE 8

Using a procedure analogous to that described in Example 1, 1-(4'-methyl - phenoxy) - 2 - hydroxy-3-isopropylamino-propane was prepared from 4-methylphenoxy-propyleneoxide and isopropylamine. Its hydrochloride had a melting point of 141–142° C.

EXAMPLE 9

Using a procedure analogous to that described in Example 1, 1 - 3',4' - dichloro - phenoxy) - 2 - hydroxy-3-isopropylamino-propane was prepared from 3,4-dichlorophenoxy-propyleneoxide and isopropylamine. Its hydrochloride had a melting point of 151–152° C.

EXAMPLE 10

Using a procedure analogous to that described in Example 5, 1 - (3',4'-dimethyl - phenoxy)-2-hydroxy-3-isopropylamino-propane was prepared from 1-(3',4'-dimethylphenoxy)-3-chloro - isopropanol and isopropylamine. Its hydrochloride had a melting point of 148–149° C.

EXAMPLE 11

Using a procedure analogous to that described in Example 5, 1 - (3',5'-dimethyl - phenoxy)-2-hydroxy-3-isoproplyamino-propane was prepared from 1-(3',5'-dimethylphenoxy) - 3 - chloro-isopropanol and isopropylamine. Its hydrochloride had a melting point of 130–132° C.

EXAMPLE 12

Using a procedure analogous to that described in Example 5, 1 - (2',5'-dimethyl - phenoxy)-2-hydroxy-3-isopropylamino-propane was prepared from 1-(2',5'-dimethylphenoxy - 3 - chloro-isopropanol and isopropylamine. Its hydrochloride had a melting point of 123–125° C.

EXAMPLE 13

Using a procedure analogous to that described in Example 1, 1 - (4' - chloro - phenoxy) - 2 - hydroxy - 3-isopropylamino-propane was prepared from 4-chlorophenoxy-propyleneoxide and isopropylamine. Its hydrochloride had a melting point of 152–154° C.

EXAMPLE 14

Using a procedure analogous to that described in Example 1, 1 - (4'-hydroxy-phenoxy) - 2 - hydroxy-3-isopropylamino-propane of the formula

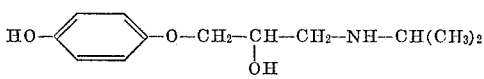

was prepared from 4-hydroxyphenoxy propyleneoxide and isopropylamine. Its hydrochloride had a melting point of 166–169° C.

EXAMPLE 15

Using a procedure analogous to that described in Example 1, 1-(2',5'-dichloro - phenoxy) - 2 - hydroxy-3-isopropylamino-propane was prepared from 2,5-dichlorophenoxy-propyleneoxide and isopropylamine. Its hydrochloride had a melting point of 153–154° C.

EXAMPLE 16

Using a procedure analogous to that described in Example 1, 1 - (3'-methoxy - phenoxy) - 2 - hydroxy-3-isopropylamino-propane was prepared from 3-methoxyphenoxy-propyleneoxide and isopropylamine. Its hydrochloride had a melting point of 77–78.5° C.

EXAMPLE 17

Using a procedure analogous to that described in Example 5, 1 - (2'-tert.butyl - 4' - methyl - phenoxy)-2-hydroxy-3-isopropylamino-propane of the formula

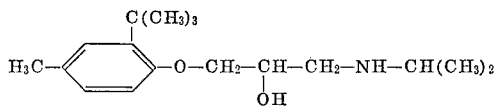

was prepared from 1-(2'-tert.butyl-4'-methylphenoxy)-3-chloro-isopropanol and isopropylamine. Its hydrochloride had a melting point of 161–162° C.

EXAMPLE 18

Using a procedure analogous to that described in Example 1, 1-(2'-hydroxy-phenoxy)-2-hydroxy-3-isopropylamino-propane was prepared from 2-hydroxyphenoxy-propyleneoxide and isopropylamine. Its hydrochloride had a melting point of 126–128° C.

EXAMPLE 19

Using a procedure analogous to that described in Example 5, 1-(2' - methyl - 4' - tert.butyl-phenoxy)-2-hydroxy-3-isopropylamino-propane was prepared from 1-(2'-methyl - 4' - tert.butyl-phenoxy)-3-chloro-isopropanol and isopropylamine. Its hydrochloride had a melting point of 110–115° C.

EXAMPLE 20

Using a procedure analogous to that described in Example 1, 1-(2',6'-dichloro-phenoxy)-2-hydroxy-3-isopropylamino-propane was prepared from 2,6-dichlorophenoxy-propyleneoxide and isopropylamine. Its hydrochloride had a melting point of 130–131° C.

EXAMPLE 21

Using a procedure analogous to that described in Example 1, 1-(2',3'-dichloro-phenoxy)-2-hydroxy-3-isopropylamino-propane was prepared from 2,3-dichlorophenoxy-propyleneoxide and isopropylamine. Its hydrochloride had a melting point of 144–146° C.

EXAMPLE 22

Using a procedure analogous to that described in Example 1, 1-(4' - benzyloxy - phenoxy)-2-hydroxy-3-isopropylamine-propane of the formula

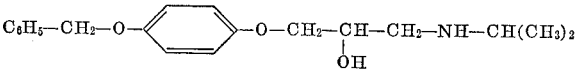

was prepared from 4-benzyloxyphenoxy-propyleneoxide and isopropylamine. Its hydrochloride had a melting point of 165–166° C.

EXAMPLE 23

Using a procedure analogous to that described in Example 1, 1-(2',3',5'-trimethyl-phenoxy)-2-hydroxy-3-isopropylamino-propane was prepared from 2,3,5-trimethylphenoxy-propyleneoxide and isopropylamine. Its hydrochloride had a melting point of 158–160° C.

EXAMPLE 24

Using a procedure analogous to that described in Example 1, 1(3'-methyl-5'-ethyl-phenoxy)-2-hydroxy-3-isopropylamino-propane was prepared from 3-methyl-5-ethyl-phenoxy-propyleneoxide and isopropylamine. Its hydrochloride had a melting point of 105–107° C.

EXAMPLE 25

Using a procedure analogous to that described in Example 1, 1-(4'-propionyl-phenoxy)-2-hydroxy-3-isopropylamino-propane of the formula

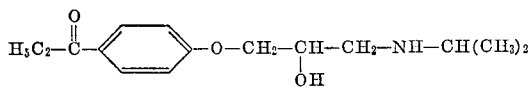

was prepared from 4-propionylphenoxy-propyleneoxide and isopropylamine. Its hydrochloride had a melting point of 168–170° C.

EXAMPLE 26

Using a procedure analogous to that described in Example 1, 1-(3',5'-dichloro-phenoxy)-2-hydroxy-3-isopropylamino-propane was prepared from 3,5-dichlorophenoxy-propyleneoxide and isopropylamine. Its hydrochloride had a melting point of 142–144° C.

EXAMPLE 27

Using a procedure analogous to that described in Example 1, 1-(3',4',5' - trimethyl - phenoxy)-2-hydroxy-3-isopropylamino-propane was prepared from 3,4,5-trimethylphenoxy-propyleneoxide and isopropylamine. Its hydrochloride had a melting point of 174–176° C.

EXAMPLE 28

Using a procedure analogous to that described in Example 1, 1-(2',4',6' - trimethyl - phenoxy)-2-hydroxy-3-isopropylamino-propane was prepared from 2,4,6-trimethyl-phenoxy-propyleneoxide and isopropylamine. Its hydrochloride had a melting point of 167–168° C.

EXAMPLE 29

Using a procedure analogous to that described in Example 1, 1-(2',4',5' - trimethyl - phenoxy)-2-hydroxy-3-isopropylamino-propane was prepared from 2,4,5-trimethylphenoxy-propyleneoxide and isopropylamine. Its hydrochloride had a melting point of 167–168° C.

EXAMPLE 30

Using a procedure analogous to that described in Example 1, 1-(2'-methyl-6'-chloro-phenoxy)-2-hydroxy-3-isopropylamino-propane of the formula

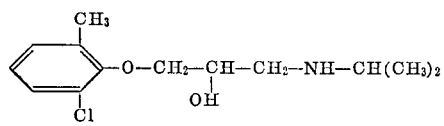

was prepared from 2-methyl-6-chlorophenoxy-propyleneoxide and isopropylamine. Its hydrochloride had a melting point of 126–128° C.

EXAMPLE 31

Using a procedure analogous to that described in Example 1, 1-(2'-methyl-4'-chloro-phenoxy)-2-hydroxy-3-isopropylamino-propane was prepared from 2-methyl-4-chlorophenoxy-propyleneoxide and isopropylamine. Its hydrochloride had a melting point of 144–146° C.

EXAMPLE 32

Using a procedure analogous to that described in Example 1, 1-(2'-propionyl-4'-chloro-phenoxy)-2-hydroxy-3-isopropylamino-propane was prepared from 2-propionyl - 4 - chlorophenoxy-propyleneoxide and isopropylamine. Its hydrochloride had a melting point of 120–123° C.

EXAMPLE 33

Using a procedure analogous to that described in Example 1, 1 - (3',5' - dimethyl-4'-chloro-phenoxy)-2-hydroxy-3-isopropylamino-propane was prepared from 3,5-dimethyl-4-chlorophenoxy-propyleneoxide and isopropylamine. Its hydrochloride had a melting point of 165–168° C.

EXAMPLE 34

Using a procedure analogous to that described in Example 1, 1 - (3'-methyl-4'-chloro-phenoxy)-2-hydroxy-3-isopropylamino-propane was prepared from 3-methyl-4-chlorophenoxy-propyleneoxide and isopropylamine. Its hydrochloride had a melting point of 139–141° C.

EXAMPLE 35

Using a procedure analogous to that described in Example 1, 1-(2'-propionyl-5'-methyl-phenoxy)-2-hydroxy-3-isopropylamino-propane was prepared from 2-propionyl - 5 - methylphenoxy-propyleneoxide and isopropylamine. Its hydrochloride had a melting point of 136–138° C.

EXAMPLE 36

Using a procedure analogous to that described in Example 1, 1 - (2'-ethyl-phenoxy)-2-hydroxy-3-isopropylamino-propane M.P. 75–77.5° C., was prepared from 2-ethyl-phenoxy-propyleneoxide and isopropylamine.

EXAMPLE 37

Preparation of 1-(3-hydroxymethylphenoxy)-2-hydroxy-3-isopropylamino-propane·HCl 23.4 gm. (0.13 mole) of 1-(3-hydroxymethylphenoxy)-2,3 - epoxy-propane were reacted with 23.4 gm. (0.04 mole) of isopropylamine using the procedure of Example 1 to obtain 1-(3-hydroxymethylphenoxy)-2-hydroxy-3-isopropylamino-propane having a melting point of 79–80° C. The corresponding hydrochloride, precipitated from ethanol with ethereal HCl, had a melting point of 98–101° C.

EXAMPLE 38

Preparation of 1-(3-methoxycarbonylphenoxy)-2-hydroxy-3-isopropylamino-propane·HCl 20.8 gm. (0.1 mole) of 1-(3 - methoxycarbonylphenoxy)-2,3 - epoxy-propane was reacted with isopropylamine according to the procedure of Example 1 to obtain 1-(3 - methoxycarbonyl-phenoxy) - 2 - hydroxy-3-isopropylamino-propane having a melting point of 75–76° C. Its hydrochloride had a melting point of 117–119° C.

EXAMPLE 39

Preparation of 1-(3-hydroxycarbonylphenoxy)-2-hydroxy-3-isopropylamino-propane·HCl 2.5 gm. (0.01 mole) of 1 - (3-methoxycarbonylphenoxy) - 2 - hydroxy - 3 - isopropylamino-propane were heated in 25 ml. of 2.5 N sodium hydroxide for 30 minutes at 95° C. with stirring to obtain a clear solution. After cooling, the solution was acidified with HCl and water was distilled off in vacuo in a rotation-evaporator. The residue was recrystallized from acetonitrile to obtain 1.1 gm. of 1-(3-hydroxycarbonylphenoxy) - 2 - hydroxy-3-isopropylamino-propane hydrochloride having a melting point of 154–156° C.

EXAMPLE 40

Preparation of 1-(2-methoxycarbonylphenoxy)-2-hydroxy-3-isopropylamino-propane·HCl Using the procedure of Example 1, 35.2 gm. (0.17 mole) of 1-(2-methoxycarbonylphenoxy) - 2,3-epoxypropane were reacted with isopropylamine to obtain 31 gm. of 1-(2-methoxycarbonylphenoxy)-2-hydroxy-3-isopropylamino-propane having a melting point of 93–95° C. Its hydrochloride had a melting point of 78–81° C.

EXAMPLE 41

Preparation of 1-(4-methoxycarbonylphenoxy)-2-hydroxy-3-isopropylamino-propane·HCl Using the procedure of Example 1, 107 gm. (0.515 mole) of 1-(4 - methoxycarbonylphenoxy) - 2,3-epoxypropane were reacted with isopropylamine to obtain 67.8 gm. of 1-(4-methoxycarbonylphenoxy)-2-hydroxy-3-isopropylamino-propane having a melting point of 85–87° C. after recrystallization from ethyl acetate. Its hydrochloride had a melting point of 171–172° C.

EXAMPLE 42

Preparation of 1-(2-hydroxycarbonyl-4-chlorophenoxy)-2-hydroxy-3-isopropylamino-propane Using the procedure of Example 39, 1-(2-methoxycarbonyl-4-chlorophenoxy)-2 - hydroxy - 3 - isopropylamino-propane was treated with sodium hydroxide to obtain 1-(2-hydroxycarbonyl - 4 - chlorophenoxy)-2-hydroxy-3-isopropylamino-propane. Its hydrochloride had a melting point of 181–183° C.

The compounds according to the present invention, that is, those embraced by Formula I, and their non-toxic, pharmacologically acceptable acid addition salts, have useful pharmocodynamic properties. More particularly, they produce bradycardia and at the same time act as N-isopropylnoradrenaline (Isoproterenol) antagonists. Thus, the tachycardiac effects caused by the administration of N-isopropylnoradrenaline are suppressed or eliminated by prior administration of one of the compounds of the present invention, and cardiac arrhythmia are equalized by them. In other words, the compounds according to the present invention block the sympathetic nervous system of the heart, which has heretofore not been possible with chemotherapeutic agents. Consequently, the areas of indication for the compounds of the present invention are hypertension, angina pectoris, cardiac arrhythmia, digitalis intoxication and pheochromocytoma disorders.

The compounds of Formula I in which R is alkoxy, preferably methoxy, and alkyl having more than one carbon atom have a high bradycardia activity. For example, 1 - (3' - methoxy-phenoxy) - 2 - hydroxy - 3 - isopropylamino-propane has a bradycardia activity of 24 as compared to the known compound, 1 - (2' - methoxyphenoxy) - 2 - hydroxy - 3 - isopropylamino - propane (J.A.C.S., vol 82/s, p. 1169), which in the same test has a bradycardia activity of 0.5.

The other compounds of Formula I, especially those in which R is methyl, are particularly valuable as isoproterenol antagonists. For example, 1 - (3' - methyl-phenoxy) - 2 - hydroxy - 3 - isopropylamino - propane is 5 times more effective as an isoproterenol antagonist than the known compound, dichloroisoproterenol, and is useful for the treatment of original cardiac activities such as angina pectoris and smooth out cardiac arrhythmia.

In view of the presence of an asymmetric carbon atom in the 2-position of the propylene chain, the compounds of the present invention exist not only in the form of racemic mixtures but also in the form of optical antipodes. The optical antipodes may be separated from the racemates by conventional methods and have the same pharmacodynamic properties as the racemates.

For therapeutic purposes in animals, the compounds of the present invention are administered perorally or parenterally as active ingredients in conventional dosage unit compositions, that is, compositions in dosage unit form consisting essentially of a major amount of an inert pharmaceutical carrier and one dosage unit of the active ingredient. Dosages of the compounds pursuant to the present invention is from 0.01 to 5 mgm./kg., depending upon the route of administration and the intensity of the effect desired or required. Thus, for oral administration the dosage range is 0.4–5 mgm./kg., preferably 1–3 mgm./kg.; for intravenous administration it is 0.01–0.2 mgm./kg., preferable 0.02–0.1 mgm./kg.; and for subcutaneous administration it is 0.02–0.1 mgm./kg., preferably 0.1–0.3 mgm./kg. Typical examples of dosage compositions are tablets, coated pills, suspensions, solutions, suppositories and the like.

The following examples illustrate a few dosage unit compositions comprising a compound according to the present invention as an active ingredient. The parts are parts by weight unless otherwise specified.

EXAMPLE 43

Hypodermic solution

The solution is compounded from the following ingredients:

| | Parts |
|---|---|
| 1-(3' - methyl - phenoxy) - 2 - hydroxy-3-isopropyl-amino-propane hydrochloride | 10.0 |
| Sodium chloride | 5.5 |
| Double distilled water q.s.ad 1000.0 parts by vol. | |

Compounding procedure

The isopropanol derivative and sodium chloride are first dissolved in about one-half of the required amount of water, the solution is then diluted with the remaining amount of distilled water to the desired volume, and the finished solution is filtered until free from suspended particles. Thereafter, it is filled into 2 cc.-ampules, which are sterilized and then sealed. Each ampule contains 10 mgm of the active ingredient.

EXAMPLE 44

Tablets

The tablet composition is compounded from the following ingredients:

| | Parts |
|---|---|
| 1-(3' - methyl-phenoxy) - 2 - hydroxy-3-isopropyl amino-propane hydrochloride | 25.0 |
| Calcium phosphate | 189.0 |
| Corn starch | 194.0 |
| Colloidal silicic acid | 14.0 |
| Polyvinylpyrrolidone | 6.0 |
| Soluble starch | 10.0 |
| Magnesium stearate | 2.0 |
| | 440.0 |

Compounding procedure

The individual ingredients are thoroughly admixed with each other, and the intimate mixture is pressed in conventional fashion into 440 mgm. tablets. Each tablet contains 25 mgm. of the active ingredient.

Although the above illustrative dosage unit compositions comprise only one of the compounds of the present invention as an active ingredient, it should be understood that any of the other compounds embraced by Formula I or a non-toxic acid addition salt thereof, either in the racemic or in the optically active d- or l-form, may be substituted therefor in Examples 43 and 44. Moreover, the amounts of the active ingredient in the illustrative examples may be varied within the indicated limits to meet particular requirements, as may the amounts and nature of the inert ingredients.

While the present invention has been illustrated with the aid of certain specific embodiments thereof, it will be readily apparent to others skilled in the art that the invention is not limited to those particular embodiments, and that various changes and modifications may be made without departing from the spirit of the invention or the scope of the appended claims.

We claim:

1. A compound selected from the group consisting of racemic 1 - phenoxy - 2 - hydroxy - 3 - isopropylamino-propane compounds of the formula

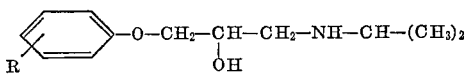

wherein R is selected from the group consisting of benzyloxy and hydroxyalkyl of 1 to 4 carbon atoms, their optically active isomers and non-toxic, pharmacologically acceptable acid addition salts of said racemates and of said optically active isomers.

2. A compound of claim 1 which is 1-(3 - hydroxymethyl-phenoxy)-2-hydroxy-3-isopropylamino-propane.

3. A compound of claim 1 which 1-(4' - benzyloxyphenoxy)-2-hydroxy-3-isopropylamino-propane.

References Cited

UNITED STATES PATENTS

| 3,275,654 | 9/1966 | Wilhelm et al. | 260—570.7 X |
| 3,432,545 | 3/1969 | Howe | 260—501.17 |
| 3,501,769 | 3/1970 | Crowther et al. | 260—570.7 X |

ROBERT V. HINES, Primary Examiner

U.S. Cl. X.R.

260—253, 307 C, 343.7, 348 R, 47 R, 501.17, 501.19, 519, 570.6, 612 I; 424—330